(12) United States Patent
Graziosi et al.

(10) Patent No.: US 12,541,884 B2
(45) Date of Patent: Feb. 3, 2026

(54) V3C SYNTAX EXTENSION FOR MESH COMPRESSION

(71) Applicants: SONY GROUP CORPORATION, Tokyo (JP); Sony Corporation of America, New York, NY (US)

(72) Inventors: Danillo Graziosi, Flagstaff, AZ (US); Ali Tabatabai, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 339 days.

(21) Appl. No.: 18/115,378

(22) Filed: Feb. 28, 2023

(65) Prior Publication Data

US 2024/0153147 A1   May 9, 2024

Related U.S. Application Data

(60) Provisional application No. 63/380,087, filed on Oct. 19, 2022.

(51) Int. Cl.
*G06T 9/00* (2006.01)
*G06T 17/20* (2006.01)

(52) U.S. Cl.
CPC ............. *G06T 9/001* (2013.01); *G06T 17/20* (2013.01)

(58) Field of Classification Search
None
See application file for complete search history.

(56) References Cited

U.S. PATENT DOCUMENTS

| 8,947,444 | B1* | 2/2015 | Hakura | G06T 1/20 |
| | | | | 345/522 |
| 10,198,860 | B1* | 2/2019 | Smith | G06T 17/20 |
| 2020/0294271 | A1* | 9/2020 | Ilola | G06T 17/20 |
| 2020/0402261 | A1* | 12/2020 | Hemmer | G06T 17/20 |
| 2022/0301348 | A1* | 9/2022 | Bradley | G06T 17/20 |
| 2022/0392115 | A1* | 12/2022 | Mammou | G06T 9/001 |

(Continued)

FOREIGN PATENT DOCUMENTS

WO   WO-2023172509 A1   9/2023

OTHER PUBLICATIONS

Danillo B Graziosi (Sony) et al: "[VDMC-NEW] Proposed Atlas Syntax for V-DMC", 140. MPEG Meeting; Oct. 24, 2022-Oct. 28, 2022; Mainz; (Motion Picture Expert Group or ISO/IEC JTC1/SC29/WG11) , No. m60984 Oct. 19, 2022 (Oct. 19, 2022), XP030305376.

(Continued)

*Primary Examiner* — Sultana M Zalalee
(74) *Attorney, Agent, or Firm* — Haverstock & Owens, A Law Corporation

(57) ABSTRACT

In the current implementation of V-DMC, the (u, v) coordinates are generated using Microsoft UVAtlas and they, together with the 3D positions and the topology, are carried in the base mesh sub-bitstream. High level syntax structures described herein support projection-based atlas map generation, and the means to derive the (u, v) coordinates on the decoder side using V3C syntax structure extensions. In comparison with previous implementations and in order to preserve the current V3C geometry bitstream concept, a separate sub-bitstream referred to hereby as vertex property sub-bitstream is used to carry displacement information.

17 Claims, 4 Drawing Sheets

(56) References Cited

U.S. PATENT DOCUMENTS

| | | | | |
|---|---|---|---|---|
| 2023/0088886 A1* | 3/2023 | Tian | ................... | H04N 19/597 |
| | | | | 375/240.03 |
| 2023/0171427 A1* | 6/2023 | Bachhuber | ........... | H04N 19/177 |
| | | | | 375/240.12 |
| 2023/0290011 A1* | 9/2023 | Kim | ....................... | G06T 9/004 |
| 2023/0401755 A1* | 12/2023 | Mammou | ............... | G06T 9/001 |
| 2024/0022765 A1* | 1/2024 | Tourapis | .............. | H04N 19/597 |

OTHER PUBLICATIONS

Jungsun Kim (Apple) et al: "VDMC Support in the V3C Framework", 139. MPEG Meeting; Jul. 18, 2022-Jul. 22, 2022; Online; (Motion Picture Expert Group or ISO/IEC JTC1/SC29/WG11), No. m60363 Jul. 21, 2022 (Jul. 21, 2022), XP030303768.

\* cited by examiner

V3C SYNTAX EXTENSION FOR MESH COMPRESSION

CROSS-REFERENCE TO RELATED APPLICATION(S)

This application claims priority under 35 U.S.C. § 119(e) of the U.S. Provisional Patent Application Ser. No. 63/380,087, filed Oct. 19, 2022 and titled, "V3C SYNTAX EXTENSION FOR MESH COMPRESSION," which is hereby incorporated by reference in its entirety for all purposes.

FIELD OF THE INVENTION

The present invention relates to three dimensional graphics. More specifically, the present invention relates to mesh compression.

BACKGROUND OF THE INVENTION

Recently, a novel method to compress volumetric content, such as point clouds, based on projection from 3D to 2D is being standardized. The method, also known as V3C (visual volumetric video-based compression), maps the 3D volumetric data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, current version of the standard is only suitable for the transmission of an unconnected set of points, so there is no mechanism to send the connectivity of points, as it is required in 3D mesh compression.

Methods have been proposed to extend the functionality of V-PCC to meshes as well. One possible way is to encode the vertices using V-PCC, and then the connectivity using a mesh compression approach, like TFAN or Edgebreaker. The limitation of this method is that the original mesh has to be dense, so that the point cloud generated from the vertices is not sparse and can be efficiently encoded after projection. Moreover, the order of the vertices affect the coding of connectivity, and different method to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. Notice that in the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

UVAtlas from Microsoft is the state-of-the-art automatic texture map generation, but requires a significant amount of time, and does optimization for a local frame only. V-PCC generates patches using orthographic projections, but targets point clouds only, so it does not address patch generation for meshes.

SUMMARY OF THE INVENTION

In the current implementation of V-DMC, the (u, v) coordinates are generated using Microsoft UVAtlas and they, together with the 3D positions and the topology, are carried in the base mesh sub-bitstream. High level syntax structures described herein support projection-based atlas map generation, and the means to derive the (u, v) coordinates on the decoder side using V3C syntax structure extensions. In comparison with previous implementations and in order to preserve the current V3C geometry bitstream concept, a separate sub-bitstream referred to hereby as vertex property sub-bitstream is used to carry displacement information.

In one aspect, a method programmed in a non-transitory memory of a device comprises implementing atlas mapping processing, performing connectivity processing to divide triangles to generate vertex information and performing vertex position processing to adjust positions of the vertices in the vertex information. The method further comprises implementing a displacement sub-bitstream to include displacement information, wherein the displacement information is utilized by the vertex position processing. The method further comprises reconstructing a mesh based on the displaced vertices and the connectivity information. Atlas mapping processing includes: receiving patch identification information and mapping function parameters and generating (u,v) coordinates based on the patch identification and mapping function parameters. The method further comprises utilizing one or more flags to bypass one or more V-DMC methods and to use a texture attribute map video as a V3C attribute component video. Implementing atlas mapping processing occurs before performing connectivity processing and vertex position processing. Implementing atlas mapping processing occurs after performing connectivity processing and vertex position processing.

In another aspect, an apparatus comprises a non-transitory memory for storing an application, the application for: implementing atlas mapping processing, performing connectivity processing to divide triangles to generate vertex information and performing vertex position processing to adjust positions of the vertices in the vertex information and a processor coupled to the memory, the processor configured for processing the application. The application is further for: implementing a displacement sub-bitstream to include displacement information, wherein the displacement information is utilized by the vertex position processing. The application is further for reconstructing a mesh based on the displaced vertices and the connectivity information. Atlas mapping processing includes: receiving patch identification information and mapping function parameters and generating (u,v) coordinates based on the patch identification and mapping function parameters. The application is further for utilizing one or more flags to bypass one or more V-DMC methods and to use a texture attribute map video as a V3C attribute component video. Implementing atlas mapping processing occurs before performing connectivity processing and vertex position processing. Implementing atlas mapping processing occurs after performing connectivity processing and vertex position processing.

In another aspect, a system comprises an encoder configured for encoding a 3D mesh to generate patch identification information and mapping function parameters and a decoder configured for: implementing atlas mapping processing on the patch identification information and the mapping function parameters, performing connectivity processing to divide triangles to generate vertex information and performing vertex position processing to adjust positions of the vertices in the vertex information. The decoder is further for: implementing a displacement sub-bitstream to include displacement information, wherein the displacement information is utilized by the vertex position processing. The decoder is further for reconstructing a mesh based on the displaced vertices and the connectivity information. Atlas mapping processing includes: receiving patch identification information and mapping function parameters and generating (u,v) coordinates based on the patch identification and mapping function parameters. The decoder is further for utilizing one or more flags to bypass one or more V-DMC methods and to use a texture attribute map video as a V3C attribute component video. Implementing atlas mapping processing occurs before performing connectivity processing and vertex position processing. Implementing atlas mapping processing occurs after performing connectivity processing and vertex position processing.

DETAILED DESCRIPTION OF THE PREFERRED EMBODIMENT

Figure 1:
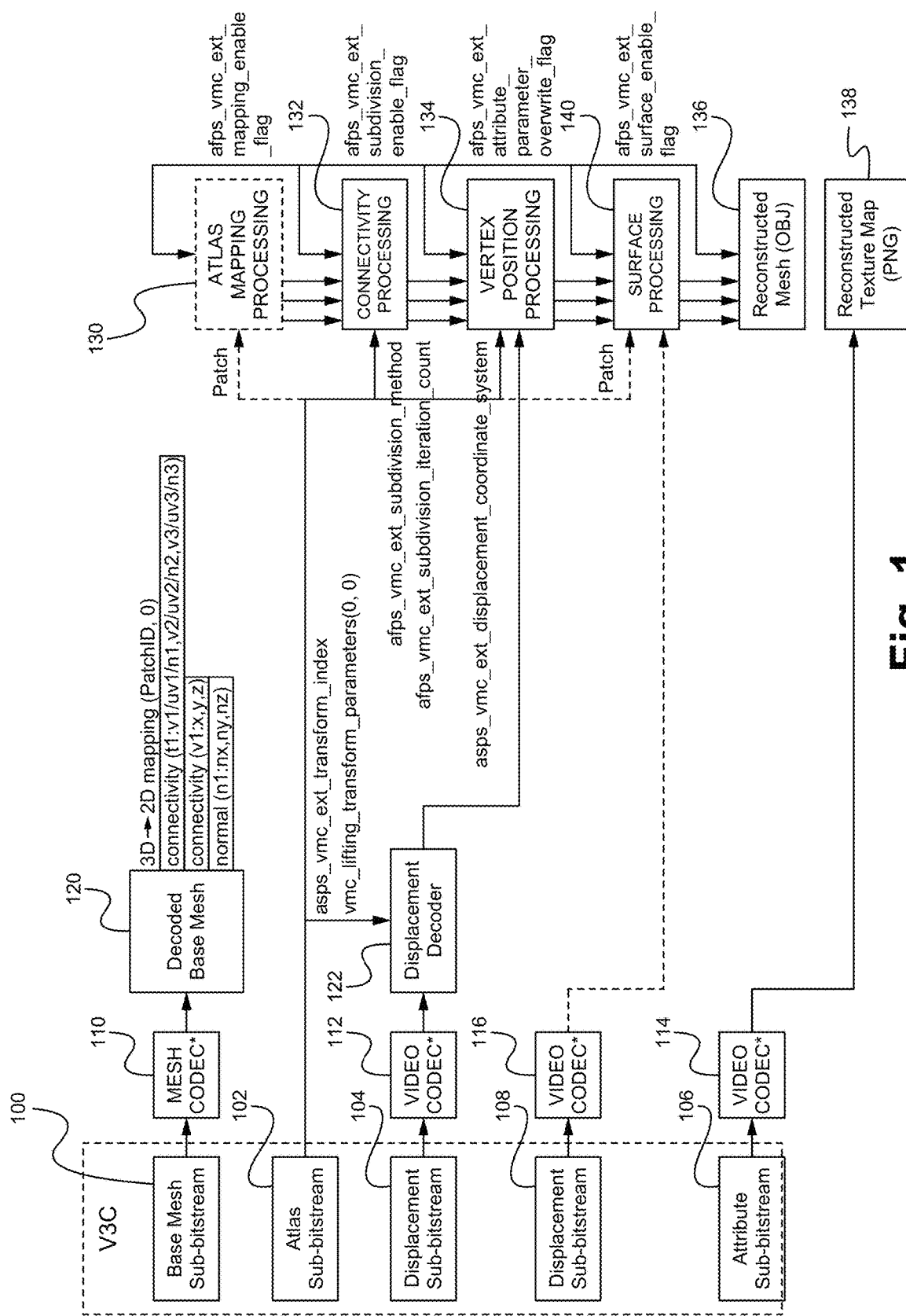
FIG. 1 illustrates a diagram of a decoding implementation according to some embodiments.

Meshes are composed of a set of polygons usually describing a surface of a volume. An efficient way to describe the surface properties of a mesh (for instance, its color characteristics) is to generate a texture atlas that maps the properties of the 3D surface onto a 2D surface. The result of the mapping function is stored in (u,v) coordinates and added to the mesh data, which is then further encoded with a mesh compression approach. However, the presence of (u,v) coordinates can significantly increase the size of the compressed meshes.

In the latest international point cloud compression standard V-PCC, depth map images are being generated for point clouds using orthographic projections. The parameters of the projection are then encoded in a metadata bitstream known as the atlas bitstream, so the decoder needs only to receive those parameters and apply the mapping function to each (u,v) coordinate of the depth map to then reconstruct the 3D information.

An extension of the current V3C standard to include syntax elements that allow for the transmission of the parameters for generating mapping coordinates for meshes using orthographic projections is described. New syntax elements define the displacement video sub-bitstream and reserve the original definition of geometry images already defined in the V3C standard. Displacement of a point (e.g., movement of a point in 3D space) is not necessarily in the direction of a projection, and a new bitstream (instead of the geometry bitstream) is able to be used to indicate the displacement. A method to define the relationship between patches and faces to be encoded with a generic mesh encoder and indicate a proper signaling is also described.

The new VDMC standard for compression of dynamic meshes is going to be a future extension of the V3C standard, the current international standard for video-based volumetric coding. The new syntax disclosed herein addresses some key new technologies for efficient encoding, such as the usage of texture mapping and displacement images, it also integrates this new technology while preserving the existing V3C syntax. The disclosed syntax allows for derivation of atlas mapping coordinates at the decoder side, and better integration with current V3C syntax elements currently being used for point cloud encoding.

New syntax elements allow the transmission of orthoAtlas parameters to the decoder: syntax for texture map generation using orthographic projections.

The flexibility to signal projection-based atlas parametrization, e.g., "orthoAtlas," includes: description and the use of V3C syntax structures and extensions to allow the derivation of (u, v) coordinates on the decoder side rather than carrying the (u, v) coordinates in the base mesh sub-bitstream as it is currently practiced, and keeping the V3C tile header syntax unchanged by assuming one-to-one correspondence between single tile and single sub-mesh, which makes the tile header syntax structure the same as V3C tile header syntax. Moreover, the signaling of the association between tile and sub-meshes is performed as part of the afps extension. The use of new patch types is similar to the ones introduced previously (e.g., I_MESH) but with minimal modifications to the original V3C patch data type information.

Separating and making explicit distinction between geometry and displacement sub-bitstreams in comparison with the approach taken previously, whereas the geometry sub-bitstream is used to carry displacement information. The displacement sub-bitstream is made into a separate sub-bitstream, instead. In this way, the geometry sub-bitstream keeps semantically consistent with the current V3C geometry concept, with the potential for possible enhancement of surface reconstruction process.

A generic module for "connectivity" processing is introduced, with a "subdivision" method as one of its instances. A number of "flags" are able to provide the option to use/bypass certain V-DMC methods. Texture attribute map video is able to be considered as a V3C attribute component video. V3C atlas tile partition information and patch information data is able to be used, and not a mesh-specific tile partition as described previously.

PatchIds and facegroupIds are signaled in the mesh bitstream as association between (patchId, facegroupId) pairs allowing for a more generic and not necessarily Draco-specific method of signaling.

FIG. 1 illustrates a diagram of a decoding implementation according to some embodiments. V3C sub-bitstreams are received. For example, base mesh sub-bitstream 100, an atlas sub-bitstream 102, a displacement sub-bitstream 104, an attribute sub-bitstream 106 are received and a geometry sub-bitstream 108. The sub-bitstreams are decoded by a mesh codec 110, a first video codec 112, a second video codec 114, or a third video codec 116. For example, the base mesh sub-bitstream 100 is decoded by the mesh coded 110; the displacement sub-bitstream 104 is decoded by the first video codec 112; and the attribute sub-bitstream 106 is decoded by the second video codec 114. The displacement sub-bitstream 104 is decoded by the video codec 112 and the displacement decoder 122.

The mesh codec 110 decodes the base mesh-sub-bitstream 100 and outputs a decoded base mesh 120, including the patch ID.

Atlas mapping processing 130 is an added implementation. The atlas mapping processing 130 receives (patchID, 0) information based on the decoded base mesh. The atlas mapping processing 130 also receives the parameters (e.g., C, P) from the atlas sub-bitstream 102 in the form of patches to re-generate the u, v coordinates.

The generated u, v coordinates are used in connectivity processing 132 and vertex processing 134. Surface processing 140 is also implemented to generate bumps or other features on the surface. The object/mesh 136 is reconstructed based on the processing. Additionally, the texture map 138 is reconstructed based on the decoded attribute sub-bitstream 106.

Figure 2:
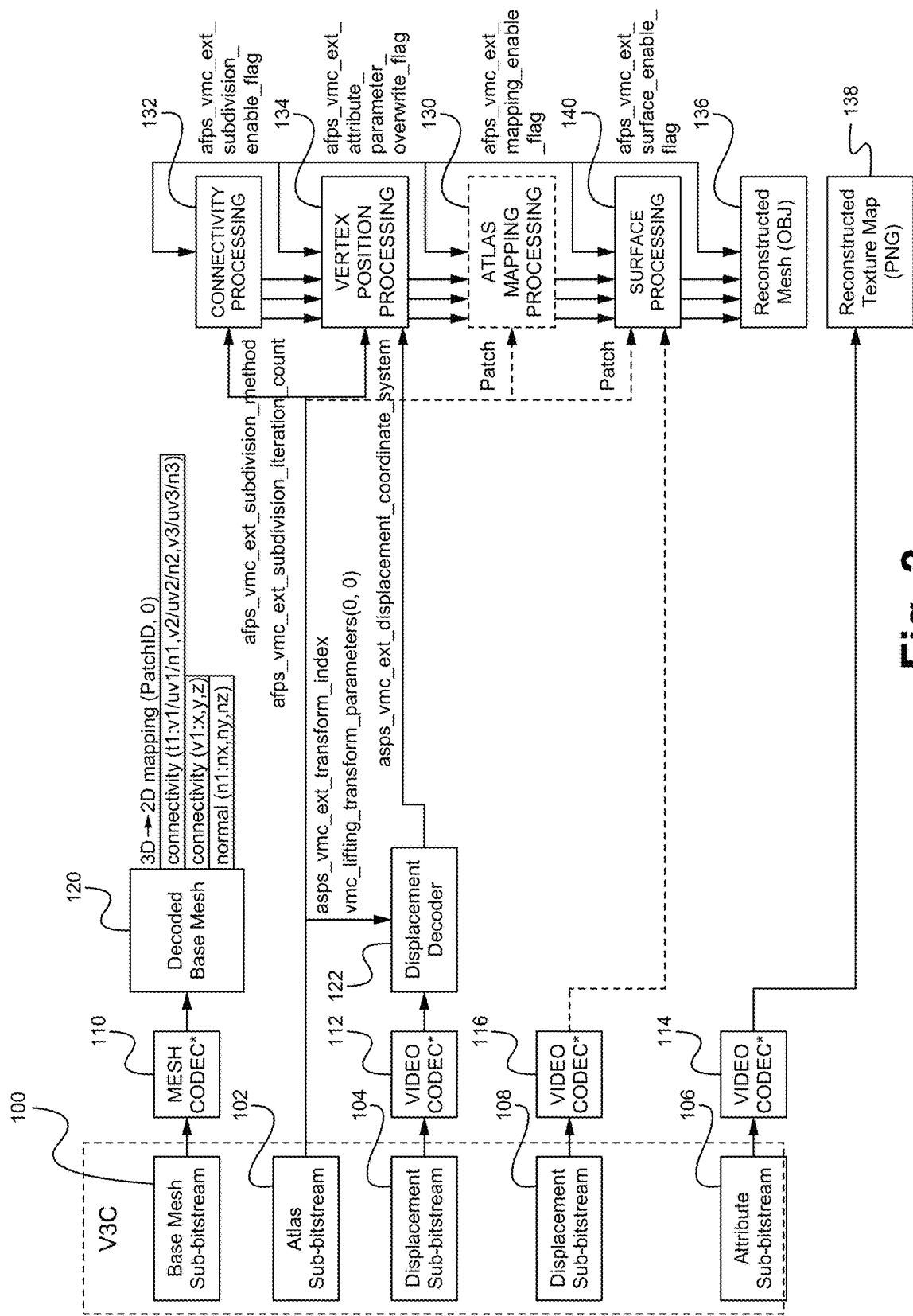
FIG. 2 illustrates a diagram of a decoding implementation according to some embodiments.

FIG. 2 illustrates a diagram of a decoding implementation according to some embodiments. The implementation is similar to the implementation described in FIG. 1; however, atlas mapping processing 130 is performed after vertex position processing 134 in this implementation. The (u, v) coordinate generation is performed in the fragment shading. There will be more (u, v) coordinates generated because the mesh is already subdivided.

Figure 3:
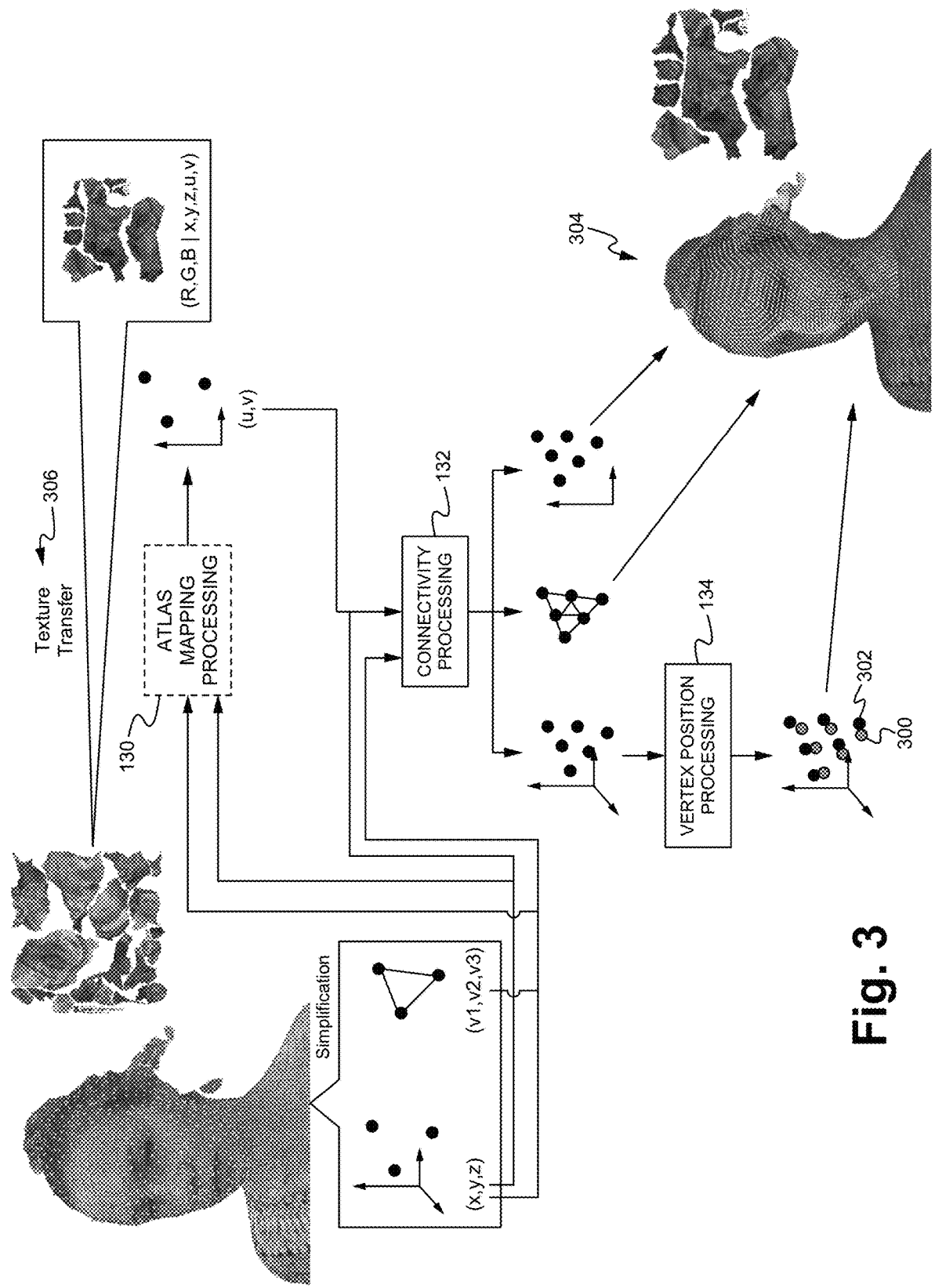
FIG. 3 illustrates a diagram of a modified V-DMC standard according to some embodiments.

FIG. 3 illustrates a diagram of a modified V-DMC standard according to some embodiments. Instead of receiving (u, v) coordinates, the simplification information ((x, y, z) and (v1, v2, v3)) is received, and the atlas mapping processing 130 generates the (u, v) coordinates. The simplification information and the (u, v) coordinates go to the connectivity processing 132 which divides the triangles to generate vertex information. Vertex position processing 134 adjusts the positions of the vertices in the vertex information. For example, the gray dots 300 represent the original position of the vertices, and the black dots 302 represent the adjusted position of the vertices. Then, the displaced vertices with the connectivity are used to reconstruct the mesh 304. Texture transfer 306 also occurs.

V-DMC High Level Syntax and Semantics

V3C Unit

|  | Descriptor |
|---|---|
| v3c_unit_header( ) { |  |
|   vuh_unit_type | u(5) |
|   if( vuh_unit_type == V3C_AVD \|\| vuh_unit_type == V3C_GVD \|\| |  |
|     vuh_unit_type == V3C_OVD \|\| vuh_unit_type == V3C_AD \|\| |  |
|     vuh_unit_type == V3C_VPD ) { |  |
|     vuh_v3c_parameter_set_id | u(4) |
|     vuh_atlas_id | u(6) |
|   } |  |
|   if( vuh_unit_type == V3C_AVD ) { |  |
|     vuh_attribute_index | u(7) |
|     vuh_attribute_partition_index | u(5) |
|     vuh_map_index | u(4) |
|     vuh_auxiliary_video_flag | u(1) |
|   } else if( vuh_unit_type == V3C_GVD ) { |  |
|     vuh_map_index | u(4) |
|     vuh_auxiliary_video_flag | u(1) |
|     vuh_reserved_zero_12bits | u(12) |
|   } else if( vuh_unit_type == V3C_VPD ) { |  |
|     vuh_vertex_property_index | u(7) |
|     vuh_reserved_zero_10bits | u(10) |
|   } else if( vuh_unit_type == V3C_OVD \|\| vuh_unit_type == V3C_AD ) |  |
|     vuh_reserved_zero_17bits | u(17) |
|   else |  |
|     vuh_reserved_zero_27bits | u(27) |
| } |  | vuh_vertex_property_index indicates the index of the vertex property data carried in the Vertex Property Data unit. The value of vuh_vertex_property_index shall be in the range of 0 to (vps_vdmc_vertex_property_video_count[vuh_atlas_id]−1), inclusive.

vuh_reserved_zero_10bits, when present, shall be equal to 0 in bitstreams conforming to this version of this document. Other values for vuh_reserved_zero_10bits are reserved for future use by ISO/IEC. Decoders shall ignore the value of vuh_reserved_zero_10bits.

```
v3c_unit_payload( numBytesInV3CPayload ) {
...
    else if ( vuh_unit_type == V3C_MD ) {
        mesh_sub_bitstream( numBytesInV3CPayload )
    else if ( vuh_unit_type == V3C_OVD || vuh_unit_type == V3C_GVD ||
        vuh_unit_type == V3C_AVD)|| vuh_unit_type == V3C_VPD )
        video_sub_bitstream( numBytesInV3CPayload )
...
```

V3C Parameter Set Extension

As the base, the extension syntax structures introduced previously are used, but some syntax elements are added and removed, as indicated below.

| | Descriptor |
|---|---|
| ```
vps_vmc_extension ( numBytesInV3CPayload ) {
  for( k = 0; k < vps_atlas_count_minus1 + 1; k++ ) {
    j = vps_atlas_id[ k ]
    vps_vdmc_mesh_data_substream_codec_id[ j ]
    vps_vdmc_mesh_data_facegroup_id_property_present_flag[ j ]
    vps_vdmc_mesh_property_count[ j ]
    for( i = 0; i < vps_vdmc_mesh_property_count[ j ]; i++ ) {
      vps_vdmc_mesh_property_type[ j ][ i ]
    }
    vps_vdmc_displacement_video_present_flag[ j ]
    vps_vdmc_vertex_property_video_count[ j ]
    for( i = 0; i < vps_vdmc_vertex_property_video_count[ j ]; i++ ) {
      vps_vdmc_vertex_property_type[ j ][ i ]
      if( vps_vdmc_vertex_property_type[ j ][ i ] ==
          DISPLACEMENT )
        displacement_information( j, i )
    }
  }
}
``` | u(8)<br>u(1)<br>u(7)<br><br>u(8)<br><br>u(1)<br>u(7)<br><br>u(8) | vps_dmc_mesh_data_substream_codec_id indicates the identifier of the codec used to compress the base mesh data. This codec may be identified through the profiles a component codec mapping SEI message, or through another implementation.

vps_vdmc_mesh_data_facegroup_id_property_present_flag equals 1 indicates that one of the property types present in the base mesh data stream is the face group ID.

vps_vdmc_mesh_property_count indicates the number of properties (e.g., texture, normal, others) in the base mesh sub-bitstream. vps_ext_mesh_property shall be in the range of 0 to 127, inclusive.

vps_vdmc_mesh_property_type[j][i] indicates the type of the i-th property present in the mesh from atlas with atlasID equals to j

| | vps_ext_mesh_property_type |
|---|---|
| MESH CONNECTIVITY | 0 |
| VERTEX POSITION | 1 |
| ATLAS MAPPING COORDINATE | 2 |
| NORMAL | 3 |
| COLOR | 4 |

-continued

| | vps_ext_mesh_property_type |
|---|---|
| FACEGROUP_ID | 5 |
| RESERVED | 5 . . . 255 | vps_vmc_ext_displacement_video_present_flag[j] equals 1 indicates that at least one of the Vertex Property Video Data is of type DISPLACEMENT.

vps_vmc_ext_vertex_property_video_count[j] indicates the number of vertex properties associated with the atlas with atlas ID j. vps_vmc_ext_vertex_property_video_count [j] shall be in the range of 0 to 127, inclusive.

vps_ext_vertex_property_type[j][i] indicates the vertex property type of the Vertex Property Video Data unit with index i for the atlas with atlas ID j. The table below describes the list of supported vertex properties and their relationship with vps_ext_vertex_property_type[j][i].

| | vps_ext_vertex_property_type[j][i] |
|---|---|
| DISPLACEMENT | 0 |
| COLOR | 1 |
| NORMAL | 2 |
| RESERVED | 3 . . . 254 |
| GENERIC | 255 |

| displacement_information( atlasID , propID ) { | Descriptor |
|---|---|
| di_displacement_codec_id[ atlasID ][ propID ] | u(8) |
| di_displacement_prevent_video_conversion_flag[ atlasID ][ propID ] | u(1) |
| di_displacement_2d_bit_depth_minus1[ atlasID ][ propID ] | u(5) |
| di_displacement_MSB_align_flag[ atlasID ][ propID ] | u(1) |
| di_displacement_frame_width[ atlasID ][ propID ] | ue(v) |
| di_displacement_frame_height[ atlasID ][ propID ] | ue(v) |
| } | | di_displacement_codec_id[j][i] indicates the identifier of the codec used to compress the Vertex Property Video Data unit with index i for the atlas with atlas ID j. di_displacement_codec_id[j][i] shall be in the range of 0 to 255, inclusive.

di_displacement_prevent_video_conversion_flag[j][i] prevents the outputs of Vertex Property Video Data unit with index i substream decoder from atlas with atlas ID j from being converted. When the flag is true, the outputs are used as they are without any conversion process from Annex B in [5]. When the flag is true, the size of displacement video shall be same as nominal video sizes indicated in the bitstream.

di_displacement_2d_bit_depth_minus1[j][i] plus 1 indicates the nominal 2D bit depth to which the Vertex Property Video Data unit with index i for the atlas with atlas ID j shall be converted to. di_displacement_2d_bit_depth_minus1[j] shall be in the range of 0 to 31, inclusive.

di_displacement_MSB_align_flag[j][i] indicates how the decoded displacement video samples associated with Vertex Property Video Data unit with index i for an atlas with atlas ID j are converted to samples at the nominal displacement bit depth.

di_displacement_frame_width[j][i] indicates the frame width of displacement video for the Vertex Property Video Data unit with index i for the atlas with atlas ID atlasID.

di_displacement_frame_height[j][i] indicates the frame height of displacement video for the Vertex Property Video Data unit with index i for the atlas with atlas ID atlasID.

Atlas Sequence Parameter Set Extension sent_flag equals to 0 specifies that the connectivity_processing_information( ) syntax structure is not present.

asps_vmc_ext_displacement_present_flag equals to 1 specifies that the displacement_processing_information( ) syntax structure is present. asps_vmc_ext_displacement_present_flag equals to 0 specifies that the displacement_processing_information( ) syntax structure is not present.

asps_vcm_ext_log 2_displacement_packing_block_size [j][i] specifies the value of the variable DisplacementPackingBlockSize, that is used for the horizontal and vertical placement of the transformed displacement vectors within the Vertex Property Video Data unit with index i for atlas with atlas ID j, as follows:

$$DisplacementPackingBlockSize = 2^{di\_log 2\_displacement\_packing\_block\_size[j][i]}$$

The value of di_log 2_displacement_packing_block_size[j][i] shall be in the range of 0 to 7, inclusive.

asps_vmc_ext_num_displacement_video indicates number of displacement videos. If vps_vmc_ext_displacement_video_present_flag is equal to one, then the default value of asps_vmc_ext_num_displacement_video is 1.

asps_vmc_ext_property_index_to_displacement_index[i] structure that maps the Vertex Property Video Data index to the displacement with index i.

asps_vmc_ext_patch_mapping_method indicates how to map a face group ID of a sub-mesh to a patch.

When asps_vmc_ext_patch_mapping_method is equal to 0, all the triangles in the corresponding submesh are associated with the current patch. In this case, there is only one patch associated with the submesh.

| | Descriptor |
|---|---|
| asps_vmc_extension( ) { | |
|   asps_vmc_ext_atlas_mapping_present_flag | u(1) |
|   if( asps_vmc_ext_atlas_mapping_present_flag ) { | |
|     atlas_map_processing_information( ) | |
|   } | |
|   asps_vmc_ext_connectivity_present_flag | u(1) |
|   if( asps_vmc_ext_connectivity_present_flag ) { | |
|     connectivity_processing_information( ) | |
|   } | |
|   asps_vmc_ext_displacement_present_flag | u(1) |
|   if( asps_vmc_ext_displacement_present_flag ) { | |
|     asps_vmc_ext_log2_displacement_packing_block_size | u(3) |
|     asps_vmc_ext_num_displacement_video | u(7) |
|     for( i=0; i < asps_vmc_ext_num_displacement_video; i++ ) | |
|       asps_vmc_ext_property_index_to_displacement_index[ i ] | u(7) |
|     displacement_processing_information( 1, 1, 1, 1, 0 ) | |
|   } | |
|   asps_vmc_ext_patch_mapping_method | u(8) |
|   asps_vmc_ext_patch_mesh_enable_flag | u(1) |
| } | | asps_vmc_ext_atlas_mapping_present_flag equals to 1 specifies that the atlas_map_processing_information( ) syntax structure is present. asps_vmc_ext_atlas_mapping_present_flag equals to 0 specifies that the atlas_map_processing_information( ) syntax structure is not present.

asps_vmc_ext_connectivity_present_flag equals to 1 specifies that the connectivity_processing_information( ) syntax structure is present. asps_vmc_ext_connectivity_pre- When asps_vmc_ext_patch_mapping_method is equal to 1, the face group_IDs and patch IDs association is explicitly signaled in the base mesh data unit.

When asps_vmc_ext_patch_mapping_method is equal to 2, the face group_IDs and patch IDs association is explicitly signaled in the mesh patch data unit.

In other cases, the triangle faces in the corresponding sub-mesh are divided into face groups by the method indicated by asps_vmc_ext_patch_mapping_method.

| asps_vmc_ext_patch_mapping_method | Description |
|---|---|
| 0 | all the triangles in the corresponding submesh are associated with the current patch |
| 1 | pair of facegroupIds and patchIds are explicitly signaled in the base mesh |
| 2 | pair of facegroupIds and patchIds are explicitly signaled in the mesh patch data unit |
| 3 ... 256 | RESERVED | asps_vmc_ext_patch_mesh_data_enable_flag equal to 1 specifies that the mesh information (i.e, number of triangles, number of vertices, 3D bounding box) of a patch with index i in a frame with index j will be indicated in the bitstream for each patch data unit. If asps_vmc_ext_patch_mesh_data_enabled_flag is equal to 0 then the mesh information shall be obtained by processing the information in the base mesh data unit.

|  | Descriptor |
|---|---|
| atlas_map_processing_information( ) { |  |
|   ampi_projection_enabled_flag | u(1) |
|   if( ampi_projection_enabled_flag ) |  |
|     ampi_atlas_mapping_method | ue(v) |
|     if( ampi_atlas_mapping_method == 0 ) { |  |
|       ampi_ortho_atlas_gutter | ue(v) |
|       ampi_ortho_atlas_width_scale | fl(64) |
|       ampi_ortho_atlas_height_scale | fl(64) |
|     } |  |
|   } |  |
| } |  | ampi_projection_enabled_flag indicates that the 2D locations where attributes are projected are explicitly signaled in the mesh patch data units. Therefore, the projection id and orientation index discussed previously can be also used.

ampi_atlas_mapping_method indicates the type of atlas mapping method used. When the signaled ampi_atlas_mapping_method is equal to 0, it indicates that the 2d (u, v) locations of orthographic projection of 3d vertices are derived on the decoder side and not signaled within the mesh bitstream.

| ampi_atlas_mapping_method | Name of atlas mapping method |
|---|---|
| 0 | orthoAtlas | ampi_ortho_atlas_gutter: A safeguard space between patches during the patch packing process when using "orthoAtlas".

ampi_ortho_atlas_lod_width_scale: width scaling factor used for packing the patches in all frames in the sequence. If not present, 1.0 should be used.

ampi_ortho_atlas_height_scale: height scaling factor used for packing the patches in all frames in the sequence. If not present, 1.0 should be used.

|  | Descriptor |
|---|---|
| connectivity_processing_information( ) { |  |
|   cpi_connectivity_method | u(3) |
|   if ( cpi_connectivity_method == SUBDIVISION ) { |  |
|     cpi_subdivision_method | u(3) |
|     cpi_subdivision_iteration_count | u(8) |
|   } |  |
|   cpi_tjunction_removing_method | ue(v) |
| } |  | cpi_connectivity_method indicates the type of connectivity method used.

| cpi_connectivity_method | Name of connectivity method |
|---|---|
| 0 | SUBDIVISION | cpi subdivision method indicates the subdivision method.

| cpi_subdivision method | Name of subdivision method |
|---|---|
| 0 | MIDPOINT | cpi_subdivision_iteration_count indicates the number of times the subdivision needs to be applied recursively.

cpi_tjunction_removing_method indicates the method to remove t-junctions generated by different subdivision methods or by different subdivision iterations of two triangles sharing an edge.

|  | Descriptor |
|---|---|
| displacement_processing_information( cFlg, tFlg, peFlg, poFlg, ltpIndex) { |  |
|   if( cFlg ) |  |
|     dppi_displacement_coordinate_system[ ltpIndex ] | u(1) |
|   if( tFlg ) { |  |
|     dppi_transform_index[ ltpIndex ][ 0 ] | u(3) |
|     if ( vppi_transform_index[ ltpIndex ][ 0 ] == LINEAR_LIFTING && peFlg ) |  |
|       vmc_lifting_transform_parameters( 0, lptIndex ) |  |
|   } |  |
|   if( poFg ) { |  |
|     for( i = 1; i < asps_vmc_ext_num_displacement_video; i++ ){ |  |
|       dppi_transform_index[ ltpIndex ][ i ] | u(3) |
|       if(dppi_transform_index[ ltpIndex ][ i ] == LINEAR_LIFTING ) { |  |
|         dppi_extension_transform_parameters_present_flag[ ltpIndex ][ i ] | u(1) |
|         if( dppi_extension_transform_parameters_ |  |

| | Descriptor |
|---|---|
|         present_flag[ ltpIndex ][ i ] )<br>          vmc_lifting_transform_<br>            parameters( i, lptIndex )<br>        }<br>      }<br>    }<br>} | | dppi_displacement_coordinate_system[ltpIndex] equals to 0 indicates that a global coordinate system will be used. dppi_displacement_coordinate_system[ltpIndex] equals to 0 indicates that a conversion to a local coordinate system will be used.

dp4pi_transform_index[lptIndex][i] indicates the transform applied to the displacement video of index i. The transform index can indicate any transform is not applied. When the transform is "LINEAR_LIFTING", the necessary parameters are signaled as "vmc_lifting_transform_parameters".

| vppi_displacement_transform_index | Name of transform method |
|---|---|
| 0 | NONE |
| 1 | LINEAR_LIFTING | dppi_extension_transform_parameters_present_flag[lptIndex][i] equals to 1 specifies that the vmc_lifting_transform_parameters( ) syntax structure for displacement video with index i is present. dppi_extension_transform_parameters_present_flag equals to 0 specifies that the vmc_lifting_transform_parameters( ) syntax structure is not present.

| | Descriptor |
|---|---|
| vmc_lifting_transform_parameters( dispIndex, ltpIndex ){<br>  vmc_transform_lifting_skip_update[ dispIndex ][ ltpIndex ]<br>  for( i = 0; i < 3; i++ ) {<br>    vmc_transform_lifting_quantization_<br>      parameters[ dispIndex ][ ltpIndex ][ i ]<br>    vmc_transform_log2_lifting_lod_<br>      inverseScale[ dispIndex ][ ltpIndex ][ i ]<br>  }<br>  vmc_transform_log2_lifting_update_weight[ dispIndex ][ ltpIndex ]<br>  vmc_transform_log2_lifting_prediction_weight[ dispIndex ][ ltpIndex ]<br>} | <br>u(1)<br><br><br>ue(v)<br><br>ue(v)<br><br>ue(v)<br>ue(v) | ltpIndex indicates the system level, whereby level 0 is for the whole sequence, level 1 for the frame, and level 2 for the patch.

| | Descriptor |
|---|---|
| Atlas Frame Parameter set extension<br>afps_vmc_extension( ) {<br>  afps_vmc_ext_single_submesh_in_frame_flag<br>  if( !afps_vmc_ext_single_submesh_in_frame_flag ) {<br>    afps_num_submesh<br>    for( i = 0; i < afps_num_submesh; i++ ) {<br>      afps_submesh_id[ i ]<br>      TileIDToSubmeshID[ afti_tile_id[ i ] ] =<br>      afps_submesh_id[ i ]<br>    }<br>  }<br>  afps_vmc_ext_overriden_flag<br>  if( afps_vmc_ext_overriden_flag ) {<br>    afps_vmc_ext_connectivity_enabled_flag<br>    if(afps_vmc_ext_connectivity_enable_flag)<br>      connectivity_processing_information( )<br>    afps_vmc_ext_displacement_enabled_flag<br>    if( afps_vmc_ext_displacement_enabled_flag ) {<br>      afps_vmc_ext_displacement_coordinate_system_<br>        enabled_flag<br>      cFlag = afps_vmc_ext_displacement_coordinate_system_<br>        enabled_flag<br>      afps_vmc_ext_transform_index_enabled_flag<br>      tFlag = afps_vmc_ext_transform_index_enabled_flag<br>      afps_vmc_ext_transform_parameters_enabled_flag<br>      peFlag = afps_vmc_ext_transform_parameters_<br>        enabled_flag | <br><br>u(1)<br><br>ue(v)<br><br>u(v)<br><br><br><br><br><br>u(1)<br><br>u(1)<br><br><br>u(1)<br><br><br>u(1)<br><br><br>u(1)<br><br>u(1) |

| | Descriptor |
|---|---|
|       afps_vmc_ext_attribute_parameter_override_flag<br>      poFlag = afps_vmc_ext_attribute_parameter_override_flag<br>      displacement_processing_<br>      information( cFlag, tFlag, peFlag, poFlag, 1 )<br>    }<br>  }<br>  afps_vmc_ext_single_vertex_property_tile_in_frame_flag | u(1)<br><br><br><br><br><br>u(1) |
|   if( !afps_vmc_ext_single_vertex_property_tile_in_frame_flag )<br>    for( i = 0; i < vps_vmc_ext_vertex_property_<br>    video_count[ atlasId ]; i++ ) {<br>      afps_ext_vmc_vertex_property_tile_information( i )<br>    }<br>} | | afps_num_submesh indicates number of sub-meshes in a mesh. In the current high-level syntax, it is assumed to be equal to afti_num_tiles_in_atlas_frame_minus1+1.

afps_submesh_id[i] indicates the ID associated with the sub-mesh with index 1.

afps_vmc_ext_single_submesh_in_frame_flag indicates there is only one sub-mesh for the mesh frame.

afps_vmc_ext_overriden_flag when true, the subdivision method, displacement coordinate system, transform index, transform parameters, and attribute transform parameters override the ones signaled in asps_vmc_extension( ).

afps_vmc_ext_single_attribute_tile_in_frame_flag indicates there is only one tile for each attribute signaled in the video streams.

Note that the attribute tile information specified previously is able to use the atlas_frame_tile_information in the case of mapped attributes.

| | Descriptor |
|---|---|
| afps_ext_vmc_vertex_property_tile_information( vpID ) {<br>  afps_vmc_ext_vertex_property_ti_uniform_<br>  partition_spacing_flag[ vpID ] | u(1) |
|   if( afps_vmc_ext_vertex_property_ti_uniform_partition_<br>  spacing_flag[ vpID ] ) {<br>    afps_vmc_ext_vertex_property_ti_partition_cols_<br>    width_minus1[ vpID ] | ue(v) |
|     afps_vmc_ext_vertex_property_ti_partition_rows_<br>    height_minus1[ vpID ] | ue(v) |
|   } else {<br>    afps_vmc_ext_vertex_property_ti_num_partition_<br>    columns_minus1[ vpID ] | ue(v) |
|     afps_vmc_ext_vertex_property_ti_num_partition_<br>    rows_minus1[ vpID ] | ue(v) |
|     for( i = 0; i < afps_vmc_ext_vertex_property_ti_num_<br>    partition_columns_minus1[ vpID ]; i++ )<br>      afps_vmc_ext_vertex_property_ti_partition_<br>      column_width_minus1[ vpID ][ i ] | ue(v) |
|     for( i = 0; i < afps_vmc_ext_vertex_property_ti_num_<br>    partition_rows_minus1[ vpID ]; i++ )<br>      afps_vmc_ext_vertex_property_ti_partition_row_<br>      height_minus1[ vpID ][ i ] | ue(v) |
|   }<br>  afps_vmc_ext_vertex_property_ti_single_partition_per_tile_flag[ vpID ] | u(1) |
|   if( !afps_vmc_ext_vertex_property_ti_single_<br>  partition_per_tile_flag[ vpID ] ) {<br>    afps_vmc_ext_vertex_property_ti_num_tiles_<br>    in_atlas_frame_minus1[ vpID ] | ue(v) |
|     for( i = 0; i < afps_vmc_ext_vertex_property_ti_num_tiles_<br>    in_atlas_frame_minus1[ vpID ] + 1; i++ ) {<br>      afps_vmc_ext_vertex_property_ti_top_left_<br>      partition_idx[ vpID ][ i ] | ue(v) |
|       afps_vmc_ext_vertex_property_ti_bottom_right_<br>      partition_column_offset[ vpID ][ i ] | ue(v) |
|       afps_vmc_ext_vertex_property_ti_bottom_right_<br>      partition_row_offset[ vpID ][ i ] | ue(v) |
|     }<br>  }<br>}<br>Patch Data Unit<br>mesh_intra_data_unit( tileID, patchIdx ) {<br>  if( asps_vmc_ext_patch_mesh_enable_flag ) {<br>    mdu_mesh_present_flag[ tileID ][ patchIdx ] | u(1) |
|     if( mdu_mesh_present_flag[ tileID ][ patchIdx ] ) {<br>      mdu_vertex_count_minus1[ tileID ][ patchIdx ] | ue(v) |
|       mdu_triangle_count_minus1[ tileID ][ patchIdx ] | ue(v) |
|       for( i =0; i < 3; i++ ) { | |

-continued

|  | Descriptor |
|---|---|
|       mdu_3d_bounding_box_<br>        min[ tileID ][ patchIdx ][ i ] | ue(v) |
|       mdu_3d_bounding_box_<br>        max[ tileID ][ patchIdx ][ i ] | ue(v) |
|       } | |
|     } | |
|   } | |
|   if( asps_vmc_ext_patch_mapping_method == 2 ) { | |
|     mdu_num_facegroups[ tileID ][ patchIdx ] | ue(v) |
|     for( i = 0; i < mdu_num_facegroups[ tileID ][ patchIdx ]; i++) | |
|       mdu_facegroup_id[ tileID ][ patchIdx ][ i ] | ue(v) |
|   } | |
|   if( ampi_atlas_mapping_method == 0 ) { | |
|     mdu_2d_pos_x[ tileID ][ patchIdx ] | ue(v) |
|     mdu_2d_pos_y[ tileID ][ patchIdx ] | ue(v) |
|     mdu_2d_size_x_minus1[ tileID ][ patchIdx ] | ue(v) |
|     mdu_2d_size_y_minus1[ tileID ][ patchIdx ] | ue(v) |
|     mdu_projection_id[ tileID ][ patchIdx ] | u(v) |
|     mdu_orientation_index[ tileID ][ patchIdx ] | u(v) |
|     if( afps_lod_mode_enabled_flag ) { | |
|       mdu_lod_enabled_flag[ tileID ][ patchIdx ] | u(1) |
|       if( mdu_lod_enabled_flag[ tileID ][ patchIdx ] > 0 ) { | |
|         mdu_lod_scale_x_minus1[ tileID ][ patchIdx ] | ue(v) |
|         mdu_lod_scale_y_idc[ tileID ][ patchIdx ] | ue(v) |
|       } | |
|     } | |
|   } | |
|   mdu_patch_parameters_enable_flag[ tileID ][ patchIdx ] | u(1) |
|   if( mdu_patch_parameters_enable_flag ) { | |
|     mdu_subdivision_enable_flag[ tileID ][ patchIdx ] | u(1) |
|     mdu_displacement_enable_flag[ tileID ][ patchIdx ] | u(1) |
|   } | |
|   if( mdu_subdivision_enable_flag[ tileID ][ patchIdx ] ) { | |
|     mdu_subdivision_method[ tileID ][ patchIdx ] | u(3) |
|     mdu_subdivision_iteration_count[ tileID ][ patchIdx ] | u(8) |
|   } | |
|   if( mdu_displacement_enabled_flag ) { | |
|     mdu_displacement_coordinate_system_enabled_flag | u(1) |
|     cFlag = mdu_displacement_coordinate_system_enabled_flag | |
|     mdu_transform_index_enabled_flag | u(1) |
|     tFlag = mdu_transform_index_enabled_flag | |
|     mdu_transform_parameters_enabled_flag | u(1) |
|     peFlag = mdu_transform_parameters_enabled_flag | |
|     mdu_attribute_parameter_override_flag | u(1) |
|     poFlag = mdu_attribute_parameter_override_flag<br>    displacement_processing_<br>    information( cFlag, tFlag, peFlag, poFlag, 2 ) | |
|   } | |
| } | | mdu_mesh_present_flag[tileID][p] equal to 1 specifies that the syntax elements related to the mesh are present in the patch p in the current atlas tile, with tile ID equal to tileID. mdu_mesh_present_flag equal to 0 specifies that the syntax elements related to mesh are not present.

mdu_vertex_count_minus1[tileID][p] plus one specifies the number of vertices in the the patch with index p of the current atlas tile, with tile ID equal to tileID. If not present, this value shall be determined by processing the base mesh data unit.

mdu_triangle_count_minus1[tileID][p] plus one specifies the number of triangles in the the patch with index p of the current atlas tile, with tile ID equal to tileID. If not present, this value shall be determined by processing the base mesh data unit.

mdu_3d_bounding_box_min[tileID][p][i] specifies the minimum value for the bounding box of the patch with index p of the current atlas tile, with tile ID equal to tileID, along the ith axis. The value of mdu_3d_bounding_box_min[tileID][p][i] shall be in the range of 0 to $2^{asps\_geometry\_3d\_bit\_depth\_minus1+1}-1$, inclusive. The number of bits used to represent mdu_3d_bounding_box_min[tileID][p] is asps_geometry_3d_bit_depth_minus1+1. If not present, this value shall be determined by processing the base mesh data unit.

mdu_3d_bounding_box_max[tileID][p][i] specifies the maximum value for the bounding box of the patch with index p of the current atlas tile, with tile ID equal to tileID, along the ith axis. The value of mdu_3d_bounding_box_max[tileID][p][i] shall be in the range of 0 to $2^{asps\_geometry\_3d\_bit\_depth\_minus1+1}-1$, inclusive. The number of bits used to represent mdu_3d_bounding_box_max[tileID][p] is asps_geometry_3d_bit_depth_minus1+1. If not present, this value shall be determined by processing the base mesh data unit.

mdu_2d_pos_x[tileID][p] specifies the x-coordinate of the top-left corner of the patch bounding box size for the patch p in the current atlas tile, with tile ID equal to tileID, expressed as a multiple of PatchPackingBlockSize.

mdu_2d_pos_y[tileID][p] specifies the y-coordinate of the top-left corner of the patch bounding box size for the patch p in the current atlas tile, with tile ID equal to tileID, expressed as a multiple of PatchPackingBlockSize.

mdu_2d_size_x_minus1[tileID][p] plus 1 specifies the width value of the patch with index p in the current atlas tile, with tile ID equal to tileID.

mdu_2d_size_y_minus1[tileID][p] plus 1 specifies the height value of the patch with index p in the current atlas tile, with tile ID equal to tileID.

mdu_projection_id[tileID][p] specifies the values of the projection mode and of the index of the normal to the projection plane for the patch with index p of the current atlas tile, with tile ID equal to tileID. The value of mdu_projection_id[tileID][p] shall be in range of 0 to asps_max_number_projections_minus1, inclusive.

The number of bits used to represent mdu_projection_id[tileID][p] is Ceil(Log 2(asps_max_number_projections_minus1+1)).

mdu_orientation_index[tileID][p] specifies the patch orientation index, for the patch with index p of the current atlas tile, with tile ID equal to tileID, used to determine the matrices P, R and O, as indicated in the Eq. (1) and Table 1, respectively for reconstruction.

mdu_lod_enabled_flag[tileID][p] equal to 1 specifies that the LOD parameters are present for the current patch p of the current atlas tile, with tile ID equal to tileID. If mdu_lod_enabled_flag[tileID][p] is equal to 0, no LOD parameters are present for the current patch. If mdu_lod_enabled_flag[tileID][p] is not present, its value shall be inferred to be equal to 0.

mdu_lod_scale_x_minus1[tileID][p] specifies the LOD scaling factor to be applied to the local x coordinate of a point in a patch with index p of the current atlas tile, with tile ID equal to tileID, prior to its addition to the patch coordinate TilePatch3dOffsetU[tileID][p]. If mdu_lod_scale_x_minus1[tileID][p] is not present, its value shall be inferred to be equal to 0.

mdu_lod_scale_y_idc[tileID][p] indicates the LOD scaling factor to be applied to the local y coordinate of a point in a patch with index p of the current atlas tile, with tile ID equal to tileID, prior to its addition to the patch coordinate TilePatch3dOffsetV[tileID][p]. If mdu_lod_scale_y_idc[tileID][p] is not present, its value shall be inferred to be equal to 0.

mesh_inter_data_unit(tileID, patchIdx), mesh_merge_data_unit(tileID, patchIdx), and mesh_skip_data_unit(tileID, patchIdx) are able to be easily defined. However, the usage of mesh_raw_data_unit(tileID, patchIdx) should be further discussed by the group.

Notice that if tileId=submeshID (which has the same independent decoding functionality) is used, there is no need to transmit a different ID to link the patch to the submesh, and the tileID is able to be used for that purpose.

Reconstruction

For generating the connectivity associated with orthoAtlas projected patches then the following applies:

Variables pIdx, oIdx, lodX, and lodY are assigned as follows:

occRes=PatchPackingBlockSize $U0$=TilePatch2dPosX[tileID][$p$]/occRes $V0$=TilePatch2dPosY[tileID][$p$]/occRes widthOccCC=TilePatch2dSizeX[tileID][$p$]/occRes heightOccCC=TilePatch2dSizeY[tileID][$p$]/occRes lodX=TilePatchLoDScaleX[tileID][$p$]*ampi_ortho_atlas_width_scale lodY=TilePatchLoDScaleY[tileID][$p$]*ampi_ortho_atlas_height_scale pID=TilePatchProjectionID[tileID][$p$]

oIdx=TilePatchOrientationIndex[tileID][$p$]

width=asps_frame_width height=asps_frame_height

Variables $BB^{min}(x)$, $BB^{min}(y)$, $BB^{min}(z)$, $BB^{max}(x)$, $BB^{max}(y)$, $BB^{max}(z)$, are assigned as follows:

$BB^{min}(x)$=TilePatch3dBoundingBoxMin[tileID][$p$][0]

$BB^{min}(y)$=TilePatch3dBoundingBoxMin[tileID][$p$][1]

$BB^{min}(z)$=TilePatch3dBoundingBoxMin[tileID][$p$][2]

$BB^{max}(x)$=TilePatch3dBoundingBoxMin[tileID][$p$][0]

$BB^{max}(y)$=TilePatch3dBoundingBoxMin[tileID][$p$][1]

$BB^{max}(z)$=TilePatch3dBoundingBoxMin[tileID][$p$][2]

Then, for each sample with coordinates (x, y, z) that belongs to the reconstructed vertex position, the conversion to the 2D u, v coordinate system is performed by first transforming (x, y, z) to a local patch coordinate pair (u*, v*), as follows:

$$\begin{bmatrix} u^* \\ v^* \end{bmatrix} = W + P * \begin{bmatrix} x - BB^{min}(x) \\ y - BB^{min}(y) \\ z - BB^{min}(z) \end{bmatrix}$$

where:

$$P(0) = \begin{bmatrix} 0 & 0 & -1 \\ 0 & 1 & 0 \end{bmatrix}, P(1) = \begin{bmatrix} 0 & 0 & 1 \\ 1 & 0 & 0 \end{bmatrix}, P(2) = \begin{bmatrix} 1 & 0 & 0 \\ 0 & 1 & 0 \end{bmatrix},$$

$$P(3) = \begin{bmatrix} 0 & 0 & 1 \\ 0 & 1 & 0 \end{bmatrix}, P(4) = \begin{bmatrix} 0 & 0 & -1 \\ 1 & 0 & 0 \end{bmatrix}, P(5) = \begin{bmatrix} -1 & 0 & 0 \\ 0 & 1 & 0 \end{bmatrix}$$

$$W(0) = \begin{bmatrix} BB^{max} - BB^{min}(z) \\ 0 \end{bmatrix}, W(1) = \begin{bmatrix} 0 \\ 0 \end{bmatrix}, W(2) = \begin{bmatrix} 0 \\ 0 \end{bmatrix},$$

$$W(3) = \begin{bmatrix} 0 \\ 0 \end{bmatrix}, W(4) = \begin{bmatrix} BB^{max} - BB^{min}(z) \\ 0 \end{bmatrix},$$

$$W(5) = \begin{bmatrix} BB^{max} - BB^{min}(z) \\ 0 \end{bmatrix},$$

Then, the final (u, v) coordinate is obtained using the following formula:

$$\begin{bmatrix} u \\ v \end{bmatrix} = \begin{bmatrix} 1/(occRes * width) & 0 \\ 0 & 1/(occRes * height) \end{bmatrix}$$

$$\left( \begin{bmatrix} U_0 * occRes \\ V_0 * occRes \end{bmatrix} + O + R * \begin{bmatrix} LoD & 0 \\ 0 & LoD \end{bmatrix} \begin{bmatrix} u^* \\ v^* \end{bmatrix} \right)$$

where:

TABLE 1

| oIdx | R(oIdx) | O(oIdx) | | Description |
|---|---|---|---|---|
| 0 | $\begin{bmatrix} 1 & 0 \\ 0 & 1 \end{bmatrix}$ | $\begin{bmatrix} 0 \\ 0 \end{bmatrix}$ | 0° | No transformation |
| 1 | $\begin{bmatrix} 0 & -1 \\ 1 & 0 \end{bmatrix}$ | $\begin{bmatrix} heightOccCC * occRes \\ 0 \end{bmatrix}$ | 90° | The y axis is inverted first, and x and y axes are swapped |
| 2 | $\begin{bmatrix} -1 & 0 \\ 1 & -1 \end{bmatrix}$ | $\begin{bmatrix} widthOccCC * occRes \\ heightOccCC * occRes \end{bmatrix}$ | 180° | The x axis and y axis are inverted |
| 3 | $\begin{bmatrix} 0 & 1 \\ -1 & 0 \end{bmatrix}$ | $\begin{bmatrix} 0 \\ widthOccCC * occRes \end{bmatrix}$ | 270° | The x axis is inverted first, and x and y axes are swapped |

Figure 4:
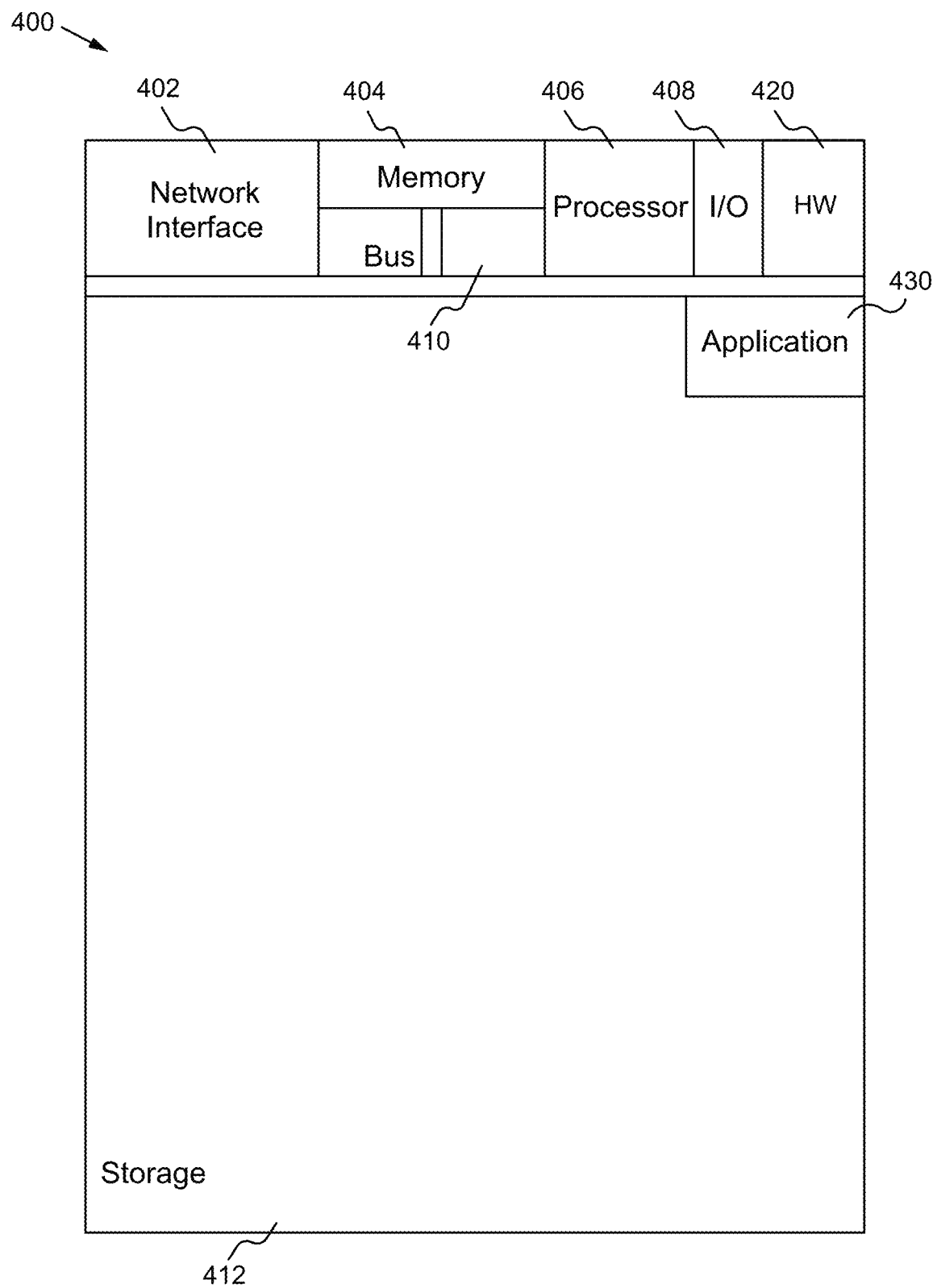
FIG. 4 illustrates a block diagram of an exemplary computing device configured to implement the mesh compression method according to some embodiments.

FIG. 4 illustrates a block diagram of an exemplary computing device configured to implement the mesh compression method according to some embodiments. The computing device 400 is able to be used to acquire, store, compute, process, communicate and/or display information such as images and videos including 3D content. The computing device 400 is able to implement any of the encoding/decoding aspects. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. Mesh compression application(s) 430 used to implement the mesh compression implementation are likely to be stored in the storage device 412 and memory 404 and processed as applications are typically processed. More or fewer components shown in FIG. 4 are able to be included in the computing device 400. In some embodiments, mesh compression hardware 420 is included. Although the computing device 400 in FIG. 4 includes applications 430 and hardware 420 for the mesh compression implementation, the mesh compression method is able to be implemented on a computing device in hardware, firmware, software or any combination thereof. For example, in some embodiments, the mesh compression applications 430 are programmed in a memory and executed using a processor. In another example, in some embodiments, the mesh compression hardware 420 is programmed hardware logic including gates specifically designed to implement the mesh compression method.

In some embodiments, the mesh compression application(s) 430 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the mesh compression method, a device acquires or receives 3D content (e.g., point cloud content). The mesh compression method is able to be implemented with user assistance or automatically without user involvement.

In operation, the mesh compression method provides the flexibility to signal projection based atlas parametrization method, e.g., "orthoAtlas," including:

description and the use of V3C syntax structures and extensions to allow the derivation of (u, v) coordinates on the decoder side rather than carrying the (u, v) coordinates in the base mesh sub-bitstream as it is currently practiced;

keeping the V3C tile header syntax unchanged with one-to-one correspondence between single tile and single sub-mesh. In comparison to previous implementations, this change keeps the V3C tile header syntax structure unchanged. The signaling of the association between tile and sub-meshes is performed as part of the afps extension.

Using V3C atlas tile partition information instead of its extension;

The use of new patch types similar to the ones introduced previously (e.g., I_MESH) but with minimal modifications to the original V3C patch data type syntax structure.

The mesh compression method separates and makes explicit distinction between geometry and displacement sub-bitstreams in comparison with the approach taken previously, whereas the geometry sub-bitstream is used to carry displacement information. As described herein, the displacement is carried in a vertex property sub-bitstream. Introducing such a separate sub-bitstream causes various vertex processing operations in the future (e.g., mesh tracking and vertex correspondence). Also with this change, the geometry sub-bitstream remains semantically consistent with the current V3C geometry sub-bitstream, providing us with the potential for possible enhancement of surface reconstruction process.

The mesh compression method introduces a generic module for "connectivity" processing, with "subdivision" method being as one of its instances.

Rather than using Draco-specific "attribute" terms, the generic term "property" is used to name all the data associated with a mesh/sub-mesh, as is done in "ply" file format, for example.

A number of "flags" are used to provide the option to use/bypass certain V-DMC methods and considering also the texture attribute map video as a V3C attribute component video.

The mesh compression method enables signaling patchIds and facegroupIds in the mesh bitstream as association between (patchId, facegroupId) pairs allowing for a more generic and not Draco-specific method of signaling.

Some Embodiments of V3C Syntax Extension For Mesh Compression

1. A method programmed in a non-transitory memory of a device comprising:
   implementing atlas mapping processing;
   performing connectivity processing to divide triangles to generate vertex information; and
   performing vertex position processing to adjust positions of the vertices in the vertex information.
2. The method of clause 1 further comprising: implementing a displacement sub-bitstream to include displacement information, wherein the displacement information is utilized by the vertex position processing.
3. The method of clause 2 further comprising reconstructing a mesh based on the displaced vertices and the connectivity information.
4. The method of clause 1 wherein atlas mapping processing includes:
   receiving patch identification information and mapping function parameters; and
   generating (u,v) coordinates based on the patch identification and mapping function parameters.
5. The method of clause 1 further comprising utilizing one or more flags to bypass one or more V-DMC methods and to use a texture attribute map video as a V3C attribute component video.
6. The method of clause 1 wherein implementing atlas mapping processing occurs before performing connectivity processing and vertex position processing.
7. The method of clause 1 wherein implementing atlas mapping processing occurs after performing connectivity processing and vertex position processing.
8. An apparatus comprising:
   a non-transitory memory for storing an application, the application for:
   implementing atlas mapping processing;
   performing connectivity processing to divide triangles to generate vertex information; and
   performing vertex position processing to adjust positions of the vertices in the vertex information; and
   a processor coupled to the memory, the processor configured for processing the application.
9. The apparatus of clause 8 wherein the application is further for: implementing a displacement sub-bitstream to include displacement information, wherein the displacement information is utilized by the vertex position processing.
10. The apparatus of clause 9 wherein the application is further for reconstructing a mesh based on the displaced vertices and the connectivity information.
11. The apparatus of clause 8 wherein atlas mapping processing includes:
    receiving patch identification information and mapping function parameters; and
    generating (u,v) coordinates based on the patch identification and mapping function parameters.
12. The apparatus of clause 8 wherein the application is further for utilizing one or more flags to bypass one or more V-DMC methods and to use a texture attribute map video as a V3C attribute component video.
13. The apparatus of clause 8 wherein implementing atlas mapping processing occurs before performing connectivity processing and vertex position processing.
14. The apparatus of clause 8 wherein implementing atlas mapping processing occurs after performing connectivity processing and vertex position processing.
15. A system comprising:
    an encoder configured for encoding a 3D mesh to generate patch identification information and mapping function parameters; and
    a decoder configured for:
    implementing atlas mapping processing on the patch identification information and the mapping function parameters;
    performing connectivity processing to divide triangles to generate vertex information; and
    performing vertex position processing to adjust positions of the vertices in the vertex information.
16. The system of clause 15 wherein the decoder is further for: implementing a displacement sub-bitstream to include displacement information, wherein the displacement information is utilized by the vertex position processing.
17. The system of clause 16 wherein the decoder is further for reconstructing a mesh based on the displaced vertices and the connectivity information.
18. The system of clause 15 wherein atlas mapping processing includes:
    receiving patch identification information and mapping function parameters; and
    generating (u,v) coordinates based on the patch identification and mapping function parameters.
19. The system of clause 15 wherein the decoder is further for utilizing one or more flags to bypass one or more V-DMC methods and to use a texture attribute map video as a V3C attribute component video.
20. The system of clause 15 wherein implementing atlas mapping processing occurs before performing connectivity processing and vertex position processing.
21. The system of clause 15 wherein implementing atlas mapping processing occurs after performing connectivity processing and vertex position processing.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   implementing atlas mapping processing, wherein an atlas sequence parameter set extension enables dividing triangle faces into face groups, wherein the face groups include a first group where all triangles are associated with a current patch, a second group where identifiers are signaled in a base mesh, and a third group where the identifiers are signaled in a mesh patch data unit, wherein atlas mapping processing includes:
   receiving patch identification information and mapping function parameters; and
   deriving (u,v) coordinates based on the patch identification and mapping function parameters;
   performing connectivity processing to divide triangles to generate vertex information;
   performing vertex position processing to adjust positions of the vertices in the vertex information; and implementing a displacement sub-bitstream to include displacement information, wherein the displacement information is utilized by the vertex position processing.

2. The method of claim 1 further comprising reconstructing a mesh based on displaced vertices and connectivity information.

3. The method of claim 1 further comprising utilizing one or more flags to bypass one or more V-DMC methods and to use a texture attribute map video as a V3C attribute component video.

4. The method of claim 1 wherein implementing atlas mapping processing occurs before performing connectivity processing and vertex position processing.

5. The method of claim 1 wherein implementing atlas mapping processing occurs after performing connectivity processing and vertex position processing.

6. The method of claim 1 further comprising implementing surface processing to generate features on a surface.

7. The method of claim 1 further comprising implementing surface processing to generate one or more bumps on a surface.

8. An apparatus comprising:
a non-transitory memory for storing an application, the application for:
implementing atlas mapping processing, wherein an atlas sequence parameter set extension enables dividing triangle faces into face groups, wherein the face groups include a first group where all triangles are associated with a current patch, a second group where identifiers are signaled in a base mesh, and a third group where the identifiers are signaled in a mesh patch data unit, wherein atlas mapping processing includes:
receiving patch identification information and mapping function parameters; and
deriving (u,v) coordinates based on the patch identification and mapping function parameters;
performing connectivity processing to divide triangles to generate vertex information;
performing vertex position processing to adjust positions of the vertices in the vertex information; and
implementing a displacement sub-bitstream to include displacement information, wherein the displacement information is utilized by the vertex position processing; and
a processor coupled to the memory, the processor configured for processing the application.

9. The apparatus of claim 8 wherein the application is further for reconstructing a mesh based on displaced vertices and connectivity information.

10. The apparatus of claim 8 wherein the application is further for utilizing one or more flags to bypass one or more V-DMC methods and to use a texture attribute map video as a V3C attribute component video.

11. The apparatus of claim 8 wherein implementing atlas mapping processing occurs before performing connectivity processing and vertex position processing.

12. The apparatus of claim 8 wherein implementing atlas mapping processing occurs after performing connectivity processing and vertex position processing.

13. A system comprising:
an encoder configured for encoding a 3D mesh to generate patch identification information and mapping function parameters; and
a decoder configured for:
implementing atlas mapping processing on the patch identification information and the mapping function parameters, wherein an atlas sequence parameter set extension enables dividing triangle faces into face groups, wherein the face groups include a first group where all triangles are associated with a current patch, a second group where identifiers are signaled in a base mesh, and a third group where the identifiers are signaled in a mesh patch data unit, wherein atlas mapping processing includes:
receiving patch identification information and mapping function parameters; and
deriving (u,v) coordinates based on the patch identification and mapping function parameters;
performing connectivity processing to divide triangles to generate vertex information;
performing vertex position processing to adjust positions of the vertices in the vertex information; and
implementing a displacement sub-bitstream to include displacement information, wherein the displacement information is utilized by the vertex position processing.

14. The system of claim 13 wherein the decoder is further for reconstructing a mesh based on displaced vertices and connectivity information.

15. The system of claim 13 wherein the decoder is further for utilizing one or more flags to bypass one or more V-DMC methods and to use a texture attribute map video as a V3C attribute component video.

16. The system of claim 13 wherein implementing atlas mapping processing occurs before performing connectivity processing and vertex position processing.

17. The system of claim 13 wherein implementing atlas mapping processing occurs after performing connectivity processing and vertex position processing.

* * * * *